(12) United States Patent
Matsumura et al.

(10) Patent No.: US 10,135,229 B2
(45) Date of Patent: Nov. 20, 2018

(54) PROTECTOR AND WIRE HARNESS

(71) Applicant: SUMITOMO WIRING SYSTEMS, LTD., Mie (JP)

(72) Inventors: Yutaka Matsumura, Mie (JP); Ichirou Komaba, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 15/531,913

(22) PCT Filed: Dec. 14, 2015

(86) PCT No.: PCT/JP2015/084969
§ 371 (c)(1),
(2) Date: May 31, 2017

(87) PCT Pub. No.: WO2016/098737
PCT Pub. Date: Jun. 23, 2016

(65) Prior Publication Data
US 2017/0331263 A1  Nov. 16, 2017

(30) Foreign Application Priority Data
Dec. 18, 2014 (JP) ................................. 2014-256624

(51) Int. Cl.
*H02G 3/04* (2006.01)
*H01B 7/00* (2006.01)
(Continued)

(52) U.S. Cl.
CPC ....... *H02G 3/0418* (2013.01); *B60R 16/0215* (2013.01); *H01B 7/0045* (2013.01);
(Continued)

(58) Field of Classification Search
CPC ... H02G 3/0468; H02G 3/0418; H01B 7/0045
(Continued)

(56) References Cited

U.S. PATENT DOCUMENTS 4,891,471 A    1/1990  Ono et al.
7,038,133 B2 *  5/2006  Arai ..................... H02G 3/0418
                                              138/115

FOREIGN PATENT DOCUMENTS

JP    04-19935      5/1992
JP    2587884      10/1998
(Continued)

OTHER PUBLICATIONS

Search Report issued in International Bureau of WIPO Patent Application No. PCT/JP2015/084969, dated Feb. 23, 2016.

*Primary Examiner* — Dhirubhai R Patel
(74) *Attorney, Agent, or Firm* — Greenblum & Bernstein, P.L.C.

(57) ABSTRACT

A protector is equipped with a first bent portion protecting part protecting a horizontally-bent first bent part of a wire group; a second bent portion protecting part protecting a downwardly-bending second bent part; a first cover part; a second cover part; and a first locking part, the first cover part being integrally linked to the first bent portion protecting part and being closed and locked, and the second cover part being integrally formed with, and developed on the same plane as, the first cover part and being bent downwardly and closed and locked after the first cover part is closed, and the second cover part being equipped with a second locking part.

7 Claims, 9 Drawing Sheets

(51) Int. Cl.
 B60R 16/02 (2006.01)
 H02G 3/06 (2006.01)
(52) U.S. Cl.
 CPC ......... H02G 3/0437 (2013.01); H02G 3/0468 (2013.01); H02G 3/0691 (2013.01); H02G 3/0487 (2013.01)
(58) Field of Classification Search
 USPC ....................................................... 174/68.3
 See application file for complete search history.

(56) References Cited

FOREIGN PATENT DOCUMENTS

| JP | 2003-134634 | 5/2003 |
| JP | 2012-217286 | 11/2012 |

* cited by examiner

PRIOR ART

Fig. 9

PRIOR ART

PROTECTOR AND WIRE HARNESS

FIELD OF THE INVENTION

The present invention relates to a protector protecting a three-dimensionally varying bent portion of a wire group, and a wire harness having this protector.

BACKGROUND OF THE INVENTION

A wire harness is routed to connect a plurality of electronic parts provided to a vehicle, and to connect each electronic part, battery and earth with one another, and is three-dimensionally routed so as to pass through a concealed gap or space running along a vehicle body frame within the vehicle, the vehicle body frame being a wire harness supporting body.

At portions of the wire harness where there is a risk that the wire harness will become disconnected by abutting on a frame or an accessory, the wire harness is configured so that a protector protects a wire group, and at a three-dimensionally varying bent portion of the wire group, the wire harness is configured so that the wire group is protected by a known protector that is formed to have a three-dimensional protection space that corresponds to the bent portion (see, for example, Patent Literature 1 and 2).

Figure 8:
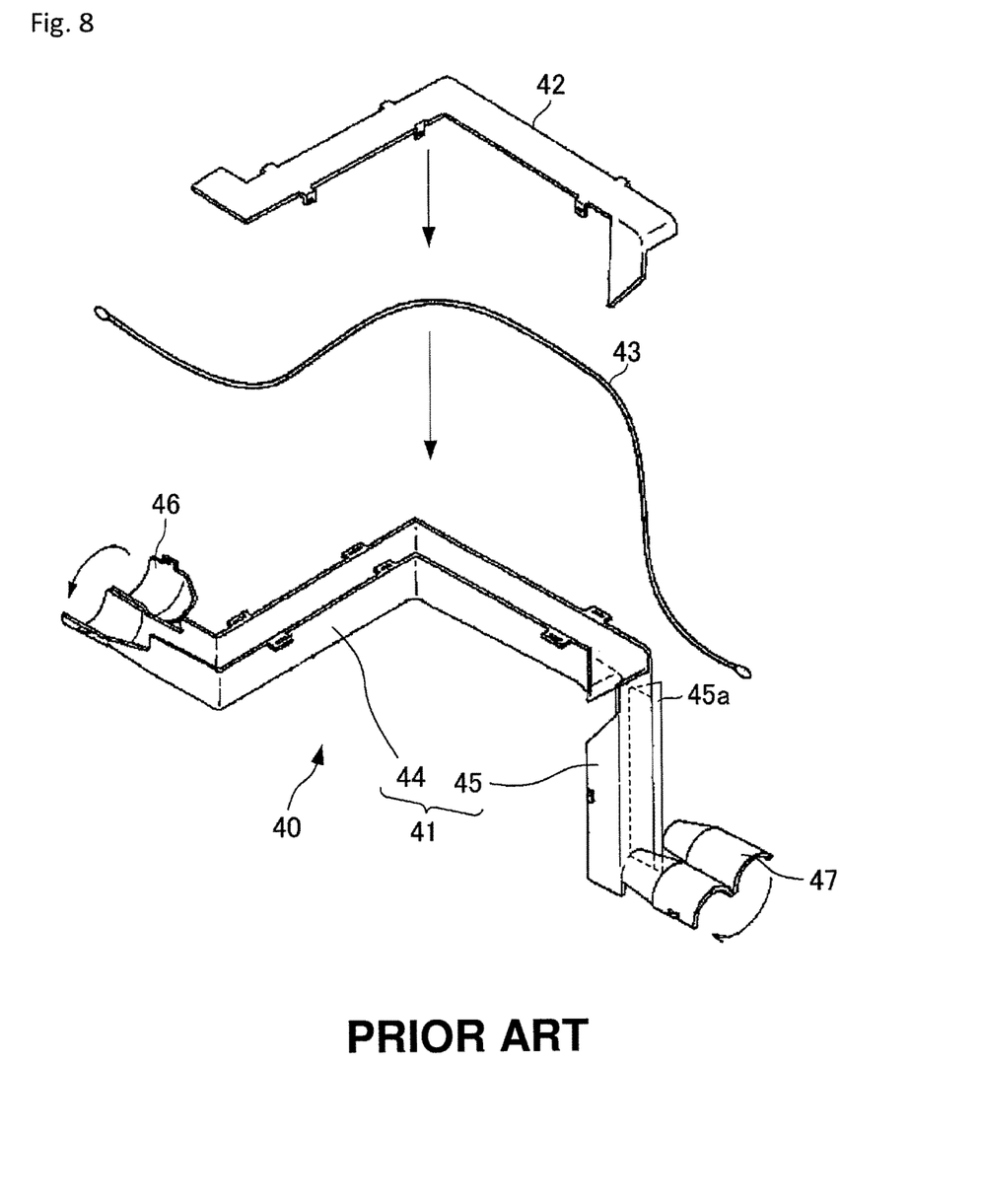
FIG. 8 is a disassembled perspective view of a protector according to a conventional example.

FIG. 8 shows a protector that is substantially the same as a protector disclosed in Patent Literature 1. A protector 40 is configured so that a protector main body 41, having a three-dimensionally varying housing space, and a separate cover 42 house and protect a wire group 43. The protector 41 includes a horizontally bent part 44 having a recessed groove-shaped cross-section and housing a horizontally bent portion of the wire group 43; a vertically bent part 45 integrally having a cover body 45a and having a recessed groove-shaped cross-section, and housing a vertically bent portion of the wire group 43; and tube clamping parts 46 and 47 open in two pieces, which are provided on the horizontally bent part 44 and the vertically bent part 45.

Figure 9:
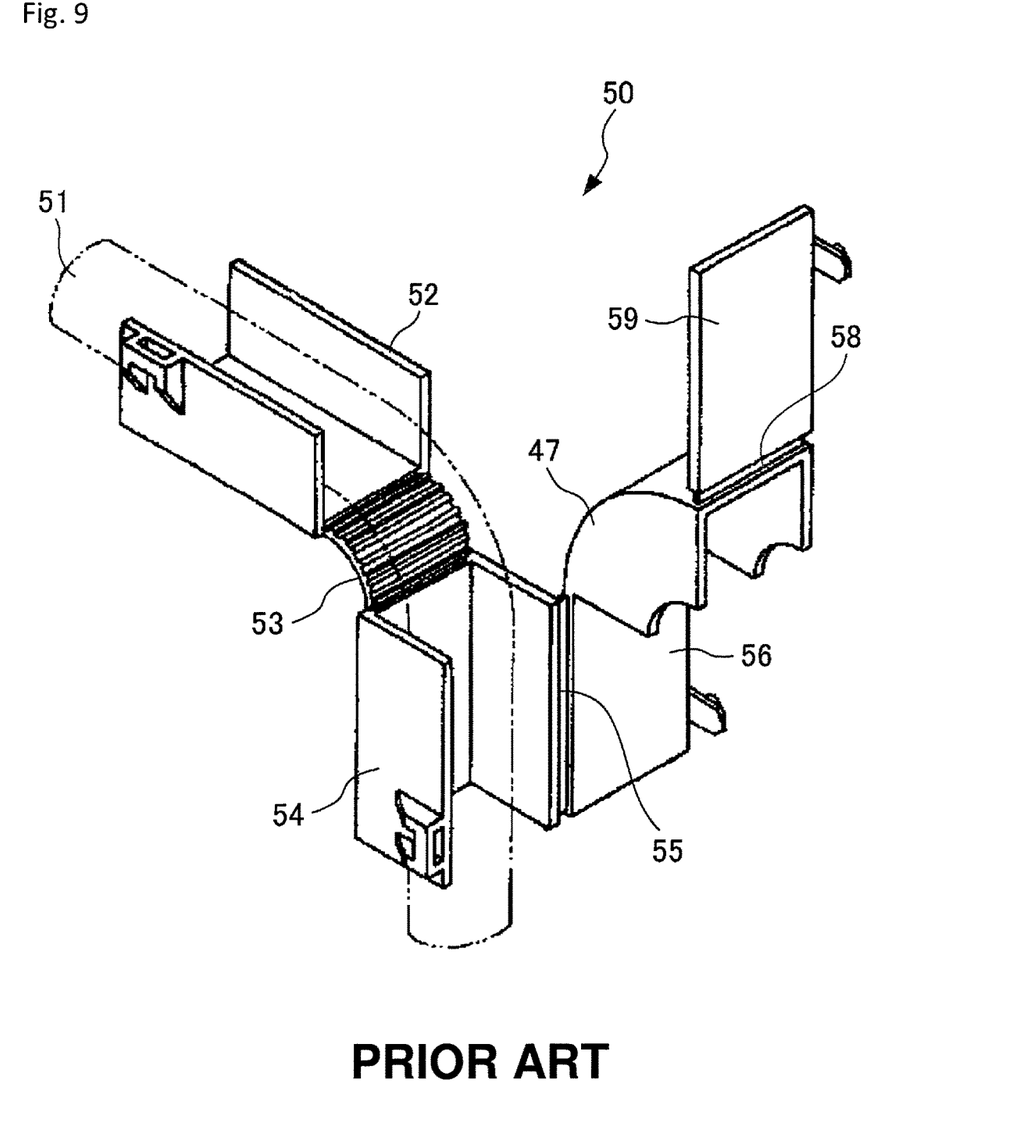
FIG. 9 is a disassembled perspective view of a protector according to another conventional example.

FIG. 9 shows a protector that is substantially the same as a protector disclosed in Patent Literature 2. A protector 50 houses and protects a bent portion of a wire group 51, the bent portion bending vertically downward from a horizontal state. The protector 50 is configured by linearly housing a wire group 51 in a wire group horizontal portion housing part 52 having a groove-shaped cross-section, a bent part 53, and a wire group vertical portion housing part 54 having a groove-shaped cross-section, the wire group horizontal portion housing part 52, the bent part 53 and the wire group vertical portion housing part 54 being formed in a straight line; the bent part 53 being bent while maintaining a state where the wire group 51 is housed in the housing parts 52 and 54; closing and locking a vertical cover 56 linked to the wire group vertical portion housing part 54 via a hinge 55; covering a portion corresponding to the bent part 53 with an elbow cover 57 integral with the vertical cover 56; and closing and locking a horizontal cover 59 linked to the elbow cover 57 via a hinge 58.

RELATED ART

Patent Literature

Patent Literature 1: Japanese Utility Model Registration No. 2587884
Patent Literature 2: Japanese Patent Laid-open Publication No. 2003-134634

SUMMARY OF THE INVENTION

Problems to Be Solved by the Invention

When manufacturing a wire group, actual dimensions of a positional relationship of an actual routing path in a vehicle to which the wire group will be installed, are measured on a drawing board, and Y-shaped locking pins are fitted thereto at required locations. Each electric wire is routed so as to lock at a forked portion of the locking pins, or, a portion of a separately, partially assembled wire group is positioned so as to lock at the locking pins. Positioned portions of the wire group in need of protection are then covered by corrugated tubes and protectors.

Therefore, in order to route the wire group on the drawing board to be in a three-dimensionally bent state using the protectors 40 and 50 disclosed in Patent Literature 1 and 2, the wire group is not only routed in a two-dimensional direction within a horizontal plane but repositioned on the drawing board in order to route portions that extend vertically downward.

Specifically, routing in an X-Y axis direction is performed on the drawing board first, and when routing in the X-Y direction is completed, the wire group is fixated using an auxiliary plate and the like so that dimensions of the routed state in the X-Y axis direction do not change. Thereafter, the wire group is removed from the drawing board and Y-shaped locking pins required for routing in a Y-axis direction are fitted to the drawing board in measured, required positions. The wire group is turned 90° relative to the drawing board, remounted on the drawing board, and routed.

Therefore, since attaching the protectors disclosed in Patent Literature 1 and 2 to the portions in need of protection, i.e., the portions of the wire group that bend in a Z-axis direction, involves repositioning of the wire group on the drawing board, manufacture of the wire harness required effort and time, thereby causing low work efficiency.

The present invention is conceived to solve the above-noted issues. With respect to protection of the three-dimensionally routed bent portion of the wire group, the present invention provides a protector and wire harness in which, following protection of the planarly-bent portion, it is possible to position the downwardly-bent portion in a planarly developed state without bending it downward and then protecting the same by bending it downward thereafter; whereby repositioning of the wire group on the drawing board can be omitted.

Means for Solving the Problems

In order to achieve the purpose set forth above, the present invention is configured by a protector protecting a bent portion of a wire group, the bent portion being routed to bend in a planar direction and then bend further in a downward direction, the protector being equipped with a first bent portion protecting part having a recessed groove-shaped cross section defined by three closed sides and housing a horizontally-bent first bent portion of the wire group; a second bent portion protecting part extending integrally downward from one end of the first bent portion protecting part, having a recessed groove-shaped cross-section defined by three closed sides and housing a downwardly-bent second bent portion of the wire group; a first cover part closing an open surface of the first bent portion protecting part; a second cover part closing an open surface of the second bent portion protecting part; and a first locking part positioning one end portion of a first corrugated tube or the wire group, the first corrugated tube protecting the wire group and being provided to another end portion of the first bent portion protecting part. The first cover part is integrally linked to a side surface upper edge portion of the first bent portion protecting part via a hinge part provided on a side surface of an outer circumference side of the first bent portion of the wire group, the side surface being adjacent to the second bent portion protecting part and, upon closing, is locked by a first cover-closing means provided between the first bent portion protecting part and the first cover part. The second cover part is integrally formed with, and developed on the same plane as, the first cover part so as to be bendable with respect to the first cover part, and after the first cover part is closed, the second cover part is bent downward to be in a closed state with respect to the second bent portion protecting part and locked by a second cover-closing means provided between the second bent portion protecting part and the second cover part. An end portion of the second cover part, the end portion being on an opposite side from a side connected to the first cover part, is provided with one end portion of a second corrugated tube or a second locking part, the second corrugated tube protecting the wire group housed in the first bent portion protecting part and the second locking part positioning the wire group.

According to the protector in the configuration described above, when routing the wire group on a drawing board, it is possible to, after housing the horizontally-bent portion in the first bent portion protecting part, position the first end portion of the first corrugated tube or the wire group as well as position one end portion of the second corrugated tube which protects the wire group at the locking part 2 and, by closing the first cover part 1, lock the first bent portion protecting part and the first cover part with the first cover-closing means. The wire group is removed from the drawing board and, by bending the second cover part downward, the wire group running along the second cover part is housed in the second bent portion protecting part, and by closing the second cover part, the second bent portion protecting part and the second cover part are closed with the second cover-closing means.

As described above, when routing the wire group on the drawing board, since the downwardly-bent portion of the wire group is positioned in the planarly-developed second cover portion following the horizontally-bent portion of the wire group; thus, after protecting the horizontally-bent portion of the wire group by the first bent portion protecting part and the first cover part, by bending the second cover part downward, it possible to protect the downwardly-bent portion of the wire group with the second bent portion protecting part and the second cover part, thereby avoiding repositioning of the wire group on the drawing board.

The first locking part is preferably configured to be provided so as to enter into a valley portion of the first corrugated tube housed in the first bent portion protecting part and lock the first corrugated tube.

In this configuration, when the one end of the first corrugated tube protecting the wire group is positioned inside the first bent portion protecting part while the wire group is being housed in the first bent portion protecting part, the first locking part enters into the valley portion of the first corrugated tube and locks, and by closing the first cover part, displacement of the first corrugated tube in an axial direction is disabled, thereby allowing for positioning of the wire group on a horizontal-side end portion of the protector.

The first locking part is preferably configured to be provided as a tape winding locking part, which locks the first corrugated tube housed in the first bent portion protecting part or the wire group by winding a tape therearound.

In this configuration, by winding the tape around the first corrugated tube or the wire group at the first locking part while the wire group is being housed in the first bent portion protecting part, the displacement of the first corrugated tube in the axial direction is disabled, thereby allowing for positioning of the wire group on the horizontal-side end portion of the protector.

The second locking part is preferably configured to be provided to a U-band part provided to the second cover part, the second cover part being in an open state and on a same plane as the first cover part, and the second locking part is provided so as to enter into a valley portion of the second corrugated tube supported by the U-band part and lock the second corrugated tube.

In this configuration, when one end portion of the second corrugated tube protecting the wire group is overlapped with the U-band part, the second locking part enters into the valley portion of the second corrugated tube and locks, and when the first cover part is closed while supporting the U-band shape from beneath, the second cover part also rotates and overlaps with the U-band shape, whereby it is possible to perform, at a horizontal position, positioning of the wire group on a lower-side end portion of the protector.

The second locking part is preferably configured to be provided as a tape winding locking part which locks the second corrugated tube abutting on an inner surface side of the second cover part or the wire group by winding a tape therearound, the second cover part being in the open state and on the same plane as the first cover part.

In this configuration, by winding the tape around the second corrugated tube abutting on the inner surface side of the second cover part or the wire group, the second cover part being on the same plane as the first cover part, displacement of the second corrugated tube in an axial direction is disabled, thereby allowing for positioning of the wire group on the horizontal-side end portion of the protector.

In order to achieve the purpose set forth above, a wire harness according to the present invention is configured by the protector according to one of the configurations described above; a wire group housed in the protector so as to be three-dimensionally bent; a first corrugated tube covering a portion of the wire group extending outwardly in a horizontal direction from inside a first end portion of the protector, where an end toward the protector-side is positioned by being locked or wound by a tape at the first locking part of the protector; and a second corrugated tube covering a portion of the wire group extending outwardly in a downward direction from inside a second end portion of the protector, where an end toward the protector-side is positioned by being locked or wound by a tape at the second locking part of the protector.

According to the wire harness in this configuration, in order to route the wire group on the drawing board, the wire group is first formed by routing, one by one, a plurality of wire groups to a Y-shaped portion of a plurality of Y-shaped locking pins which are fitted to the drawing board in a required placement, and both sides of a bent portion of the wire group are protected by the first corrugated tube and the second corrugated tube, the bent portion being routed to bend in the planar direction and then bend further in the downward direction. Next, the horizontally-bent portion of the wire group is housed in the first bent portion protecting part and the first corrugated tube is locked by the first locking part, and by closing the first cover part, the horizontally-bent portion of the wire group can be protected by the first bent portion protecting part and the first cover part. Following that, to an undersurface of the first second cover part positioned on the same plane as the first cover part, the downwardly-bent portion of the wire group is overlapped with the second cover part without bending it downward and maintaining a planarly developed state, and by locking the second corrugated tube with the second locking part, it is possible to perform, in a planarly developed position, positioning of the second corrugated tube. Next, by closing the second cover part by bending it downward, the downwardly-bent portion of the wire group can be protected by the second bent portion protecting part and the second cover part. Thereby, repositioning of the wire group on the drawing board can be avoided.

In order to achieve the purpose set forth above, another wire harness according to the present invention is configured by the protector according to one of the configurations described above and a wire group housed in the protector to be three-dimensionally bent, where the wire group is positioned by being wound by a tape at the first locking part and the second locking part provided to both end portions of the protector.

According to the wire harness according to this configuration, portions of the wire group that extend from both sides of the protector, and which are used under routing conditions in which it is not necessary to protect the wire group on both sides of the protector by corrugated tubes, are wound with a tape, thereby allowing for positioning of the wire group. Thus, the horizontally-bent portion of the wire group can be protected by the first bent portion protecting part and the first cover portion, and the downwardly-bent portion of the wire group can be protected by the second bent portion protecting part and the second cover part. Thereby, repositioning of the wire group on the drawing board can be avoided.

Effect of the Invention

According to the present invention, in routing the wire group on the drawing board, with respect to protection of the three-dimensionally routed bent portion of the wire group, it is possible to provide a protector and wire harness in which, following protection of the planarly-bent portion, it is possible to position the downwardly-bent portion in the planarly developed state without bending it downward and then protecting the same by bending it downward thereafter; whereby repositioning of the wire group on the drawing board can be omitted.

MODE FOR CARRYING OUT THE INVENTION

Next, embodiments of the present invention will be described with reference to the drawings.

First Embodiment

Figure 1:
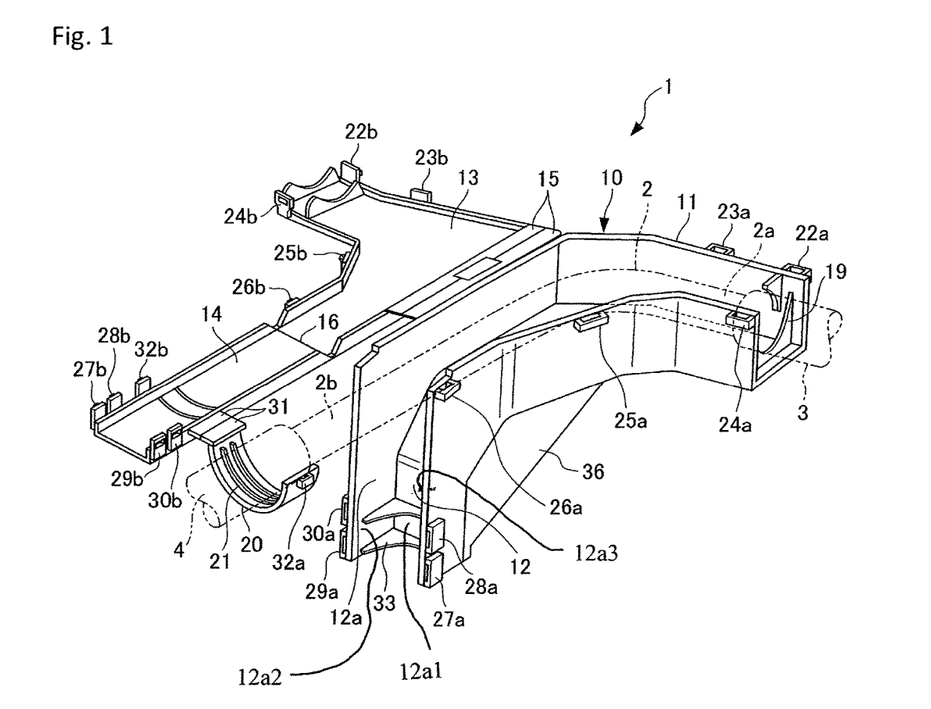
FIG. 1 is a perspective view of a protector according to a first embodiment of the present invention, in a state where a cover portion is open.
Figure 2:
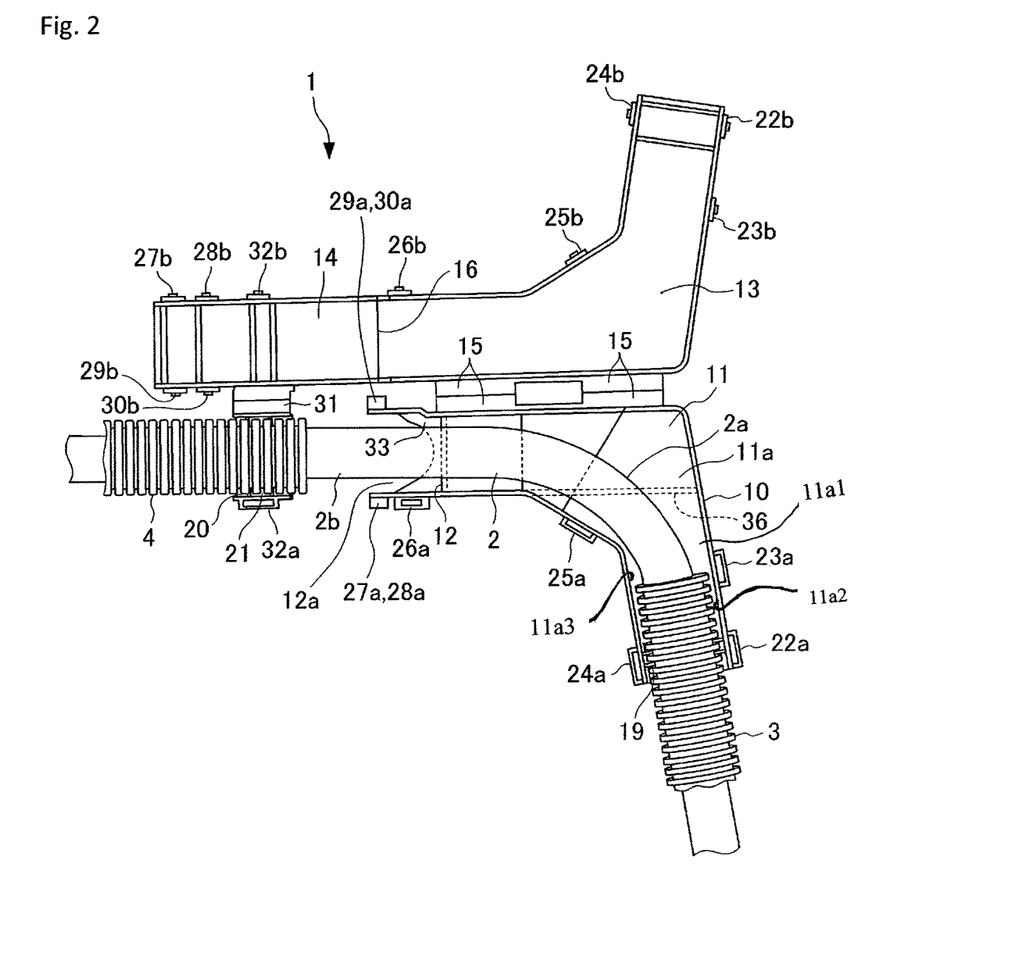
FIG. 2 is a plan view of a wire harness according to the first embodiment of the present invention, in a state where the cover portion is open.

A configuration of a wire harness according to the present embodiment is described with reference to FIGS. 1 through 5. As shown in FIGS. 1 and 2, a wire harness 1 is equipped with a wire group 2; a protector 10 protecting a bent portion of the wire group 2, the bent portion being routed to bend in a planar direction and then bend further in a downward direction; and a first corrugated tube 3 and a second corrugated tube 4 protecting the wire group 2 at both sides of the protector 10.

In the wire harness 1, both side portions of a portion of the wire group 2 protected by the protector 10 are protected by the first corrugated tube 3 and the second corrugated tube 4 made of synthetic resin, and one end of the first corrugated tube 3 and one end of the second corrugated tube 4 are respectively locked in a state of being put inside a horizontal-side end portion and a suspended-side end portion of the protector 10.

The wire group 2 is configured by a plurality of covered electrical wires, and can be a main line or a branch line.

Figure 3:
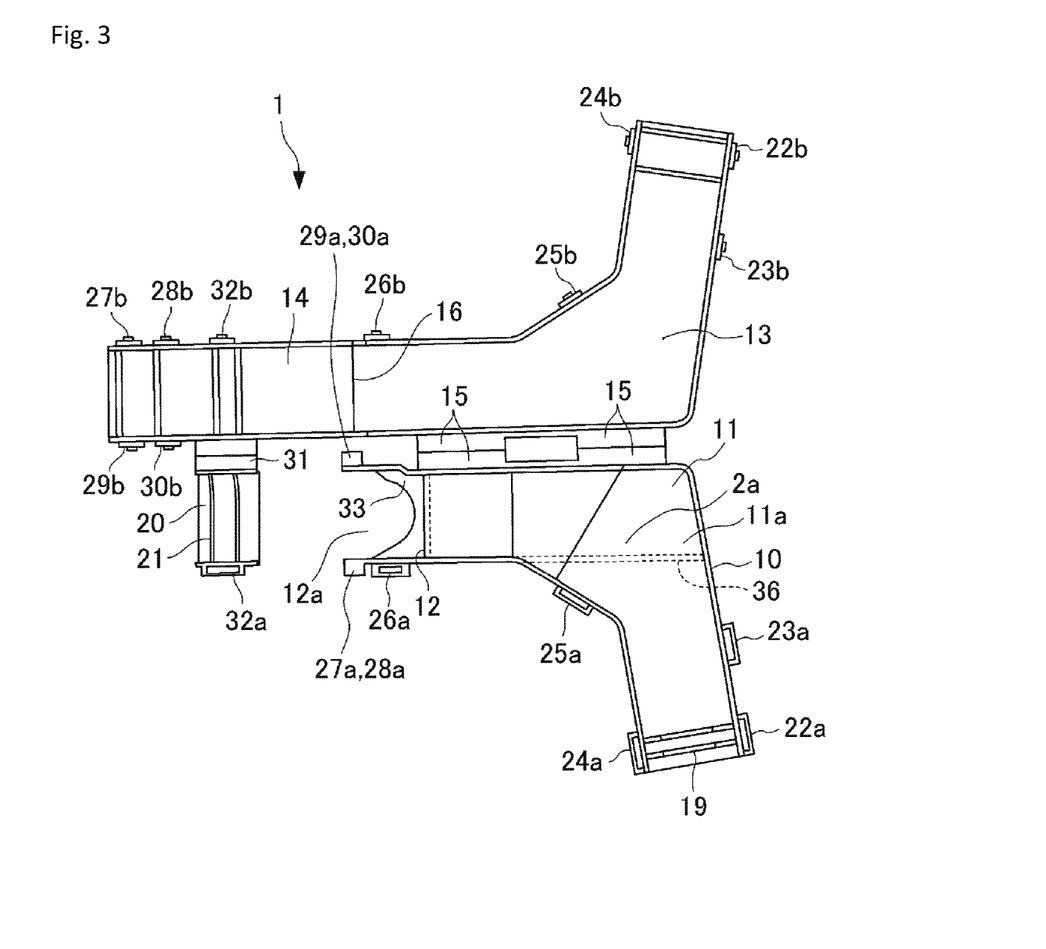
FIG. 3 is a plan view of the protector according to the first embodiment of the present invention, in a state where the cover portion is open.

As shown in FIGS. 1 through 3, the protector 10 is formed of synthetic resin materials such as, for example, polypropylene, polyethylene and the like, and is equipped with a first bent portion protecting part 11, a second bent portion protecting part 12, a first cover part 13, a second cover part 14, a first locking part 19, and a plurality of pairs of male-female first and second cover-closing means (to be described later). In addition, in the present embodiment, the second cover part 14 is equipped with a U-band part 20, and the U-band part 20 is equipped with a second locking part 21.

The first bent portion protecting part 11 is formed to have a wire group housing space 11a. The wire group housing space 11a has a vertical cross-section in a shape of a recessed groove, defined by left-and-right side surface portions surrounding both bottom surface portions. The wire group housing space 11a, in a plan view, is formed in a two-dimensional space corresponding to a horizontally bent first bent part 2a of the wire group 2. Therefore, the first bent portion protecting part 11 houses and protects the horizontally bent first bent part 2a of the wire group 2 in the wire group housing space 11a. For example, the recessed groove-shaped cross section may be defined by three intersecting surfaces 11a1, 11a2, 11a3 of the first bent portion protecting part 11. See FIG. 2.

The first bent portion protecting part 11 is equipped with the first locking part 19 positioned inside a horizontal-side end portion and being in a form of a plurality of ribs. The first locking part 19 enters into a valley portion of the one end portion of the first corrugated tube 3 which protects the wire group 2 and is positioned so as to be inserted into the horizontal-side end portion of the first bent portion protecting part 11, thereby positioning the first corrugated tube 3 by restricting displacement thereof in an axial direction.

As shown in FIG. 1, the second bent portion protecting part 12 is formed to have a wire group housing space 12a. The wire group housing space 12a has a horizontal cross-section in a shape of a recessed groove, defined by three vertical wall portions which correspond to a bottom surface portion and left-and-right side surface portions of the first bending part 2a and bent downward from an end portion of the first bent portion protecting part 11 near the second corrugated tube 4. Therefore, the second bent portion protecting part 12 houses and protects a second bent part 2b of the wire group 2 in the wire group housing space 12a, the second bent part 2b bending downward from the first bent part 2a. A third locking part 33 is provided to a lower end portion of the second bent portion protecting part 12. It is noted that a lower surface of the first bent portion protecting part 11 and the second bent portion protecting part 12 is reinforced by a reinforcing rib 36. For example, the recessed groove-shaped cross section may be defined by three intersecting surfaces 12a1, 12a2, 12a3 of the second bent portion protecting part 12. See FIG. 1.

The first cover part 13 has a corresponding two-dimensionally bent shape so as to close an open surface of the first bent portion protecting part 11, and is integrally linked in an open state to an upper edge portion of one side on the second bent portion protecting part 12-side of the first bent portion protecting part 11, via a hinge part 15.

Since the hinge part 15 is provided so as to be bendable only in a direction opposite to a direction in which the first cover part 13 would otherwise hang down, the first cover part 13 is supported in a cantilevered state and prevented from hanging downward.

As shown in FIGS. 1 through 3, the first bent portion protecting part 11 is equipped with female first cover-closing means 22a through 26a, and the first cover part 13 is equipped with male first cover-closing means 22b through 26b which correspond to the female first cover-closing means 22a through 26a. The second bent portion protecting part 12 is equipped with female second cover-closing means 27a through 30a, and the second cover part 14 is equipped with male second cover-closing means 27b through 30b which correspond to the female second cover-closing means 27a through 30a.

When the first cover part 13 is bent at the hinge part 15, it closes the open surface of the first bent portion protecting part 11 and, at this time, the female first cover-closing means 22a through 26a and the male first cover-closing means 22b through 26b are respectively engaged and locked.

As shown in FIGS. 1 through 3, the second cover part 14 has a corresponding shape so as to close an open surface of the second bent portion protecting part 12. The second cover part 14 is not linked to the second bent portion protecting part 12 via a hinge but is integrally formed with, and developed on the same plane as, the first cover part 13, via a thin part 16 bendable with respect to the first cover part 13. Since the second cover part 14 is linked to the first cover part 13 at the thin part 16, after the first cover part 13 is closed, the second cover part 14 is downwardly bendable from the thin part 16 relative to the first cover part 13.

When the second cover part 14 is bent downward after the first cover part 13 is closed, the second over part 14 closes the open surface of the second bent portion protecting part 12 and, at this time, the female second cover-closing means 27a through 30a and the male second cover-closing means 27b through 30b are respectively engaged and locked.

As shown in FIGS. 1 through 3, in a state where the first cover part 13 and the second cover part 14 are maintaining the same plane in an open state, the second cover part 14 is equipped with the U-band part 20, the U-band part 20 being in an open state with respect to the second cover part 14. The U-band part 20 is supported by the second cover part 14 via a hinge part 31.

Since the hinge part 31 is provided so as to be bendable only in a direction opposite to a direction in which the U-band part 20 would otherwise hang down, the U-band part 20 is supported in the cantilevered state and prevented from hanging downward. A bendable line of the hinge part 31 is on the same line as a bendable line of the hinge part 15.

In a state where the first cover part 13 and the second cover part 14 are maintaining the same plane in the open state, and the U-band part 20 is in an open state with respect to the second cover part 14, by extending in the horizontal direction without bending downward the wire group 2 to be housed in the first bent portion protecting part 11, the U-band part 20 is capable of housing and receiving the wire group 2.

The U-band part 20 is equipped with the second locking part 21 in a form of a plurality of arc-shaped ribs. The second locking part 21 enters into a valley portion of the second corrugated tube 4 which protects the wire group 2 and is received by the U-band part 20, thereby positioning the second corrugated tube 4 by restricting displacement thereof in an axial direction.

The U-band part 20 is equipped with a female band locking means 32a, and the second cover part 14 is equipped with a male band locking means 32b. When the hinge part 31 is bent so that the U-band part 20 and the second cover part 14 are closed together, the band locking means 32a and 32b are engaged and locked.

In order to manufacture the wire harness 1 of the above-described configuration on a drawing board, the protector 10 is first placed in a prescribed position on the drawing board, and a plurality of Y-shaped locking pins (not shown in the drawings) are fitted thereto in a required placement. Next, a plurality of wire groups configuring the wire group are locked to a Y-shaped portion of the Y-shaped locking pins one by one, then passed through the wire group housing space 11a formed by the first bent portion protecting part 11 of the protector 10, then passed over the U-band part 20 so as to form the wire group 2 shown in FIG. 1, and then roughly wound with tape.

The wire group 2 formed at this stage does not have the bent portion to be routed to bend downward. Then, as shown in FIG. 1, both sides of the wire group 2 are protected by the first corrugated tube 3 and the second corrugated tube 4. The wire group 2 shown in FIG. 1, which has a shape that bends substantially two dimensionally, may be produced on another drawing board that is not provided with the protector 10, and then removed from the drawing board to continue manufacture thereof on a drawing board that is provided with the protector 10.

As shown in FIG. 2, when the end portion of the first corrugated tube 3 covering the wire group 2 is housed in the first bent portion protecting part 11, the first locking part 19 positions and locks the end portion of the first corrugated tube 3. In addition, when the end portion of the second corrugated tube 4 covering the wire group 2 is placed over the U-band part 20, the second locking part 21 positions and locks the end portion of the second corrugated tube 4.

Figure 4:
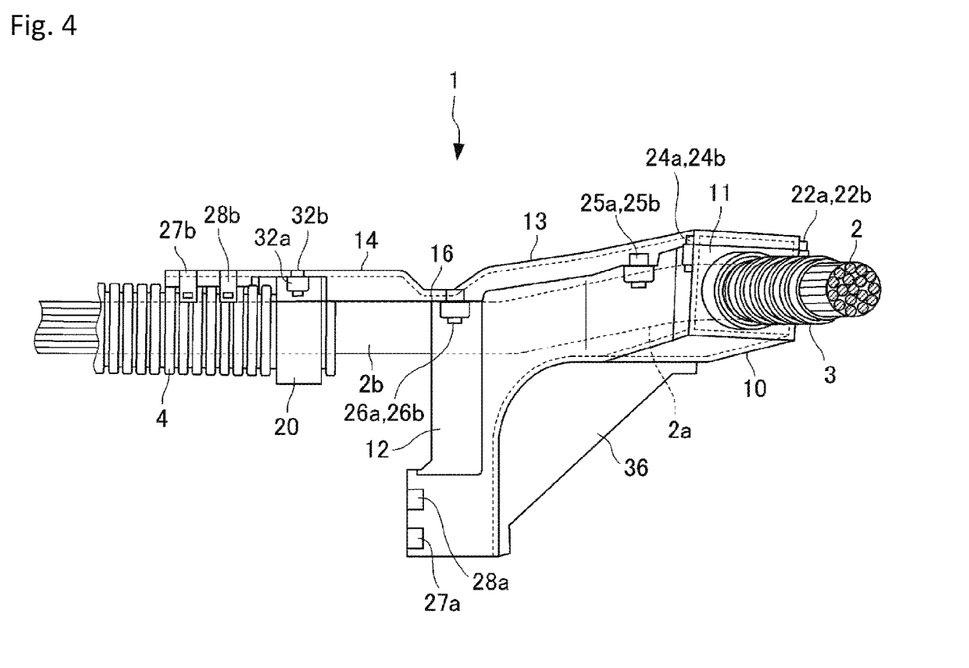
FIG. 4 is a front view of the wire harness according to the first embodiment of the present invention, in a state where a first cover portion of the protector is closed.

Next, as shown in FIG. 4, while keeping the U-band part 20 stationary, the first cover part 13 is closed while supporting an undersurface of the U-band part 20, and the female first cover-closing means 22a through 26a and the male first cover-closing means 22b through 26b are respectively engaged and locked. In this case, since the bendable line of the hinge part 15 and the bendable line of the hinge part 31 are on the same line, the second cover part 14 rotates integrally with the first cover part 13 and overlaps with the U-band part 20 being supported so as not to rotate, whereby the band locking means 32a and 32b are engaged and locked. As a result, the horizontally-bent portion of the wire group 2 can be protected by the first bent portion protecting part 11 and the first cover part 13, and the end portion of the second corrugated tube 4 is held by the second cover part 14 and the U-band part 20.

When the U-band part 20 is not supported so as to remain stationary upon closing the first cover part 13, the rotating action of closing the first cover part 13 is transmitted to the second cover part 14 and the U-band part 20, thereby causing the end portion of the second corrugated tube 4 being received by the U-band part 20 to fall; thus, supporting the U-band part 20 so as to remain stationary is required.

Figure 5:
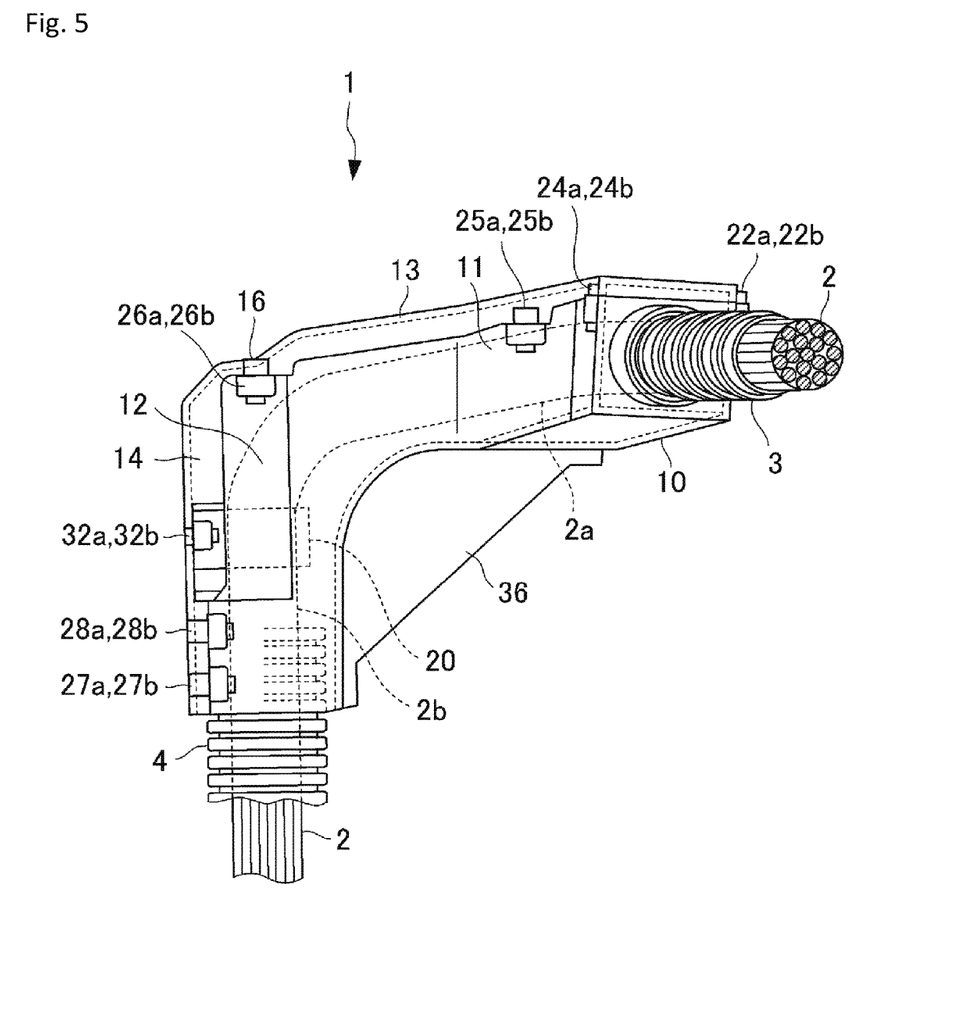
FIG. 5 is a front view of the wire harness according to the first embodiment of the present invention, in a state where the cover portion of the protector is closed.

Next, as shown in FIG. 5, when the second cover part 14 is bent toward a lower side with respect to the first cover part 13, the second cover part 14 closes the opening of the second bent portion protecting part 12, whereby the third locking part 33 overlaps and locks the end portion of the second corrugated tube 4 on a lower side of the U-band part 20, and the female second cover-closing means 27a through 30a and the male second cover-closing means 27b through 30b are respectively engaged and locked. Thus, the wire group 2 is housed in the wire group housing space 12a of the second bent portion protecting part 12. Thereby, the second bent portion protecting part 12 and the second cover part 14 protect the downside-bending bent portion of the wire group 2.

As described above, according to the wire harness 1 according to the present embodiment, with respect to protection of the three-dimensionally routed bent portion of the wire group 2, it is possible to, following protection of the planarly-bent first bent portion 2a, position the downwardly-bent second bent portion 2b in the planarly developed state without bending it downward and then protecting the same by bending it downward thereafter; whereby repositioning of the wire group 2 on the drawing board can be omitted.

Second Embodiment

Figure 6:
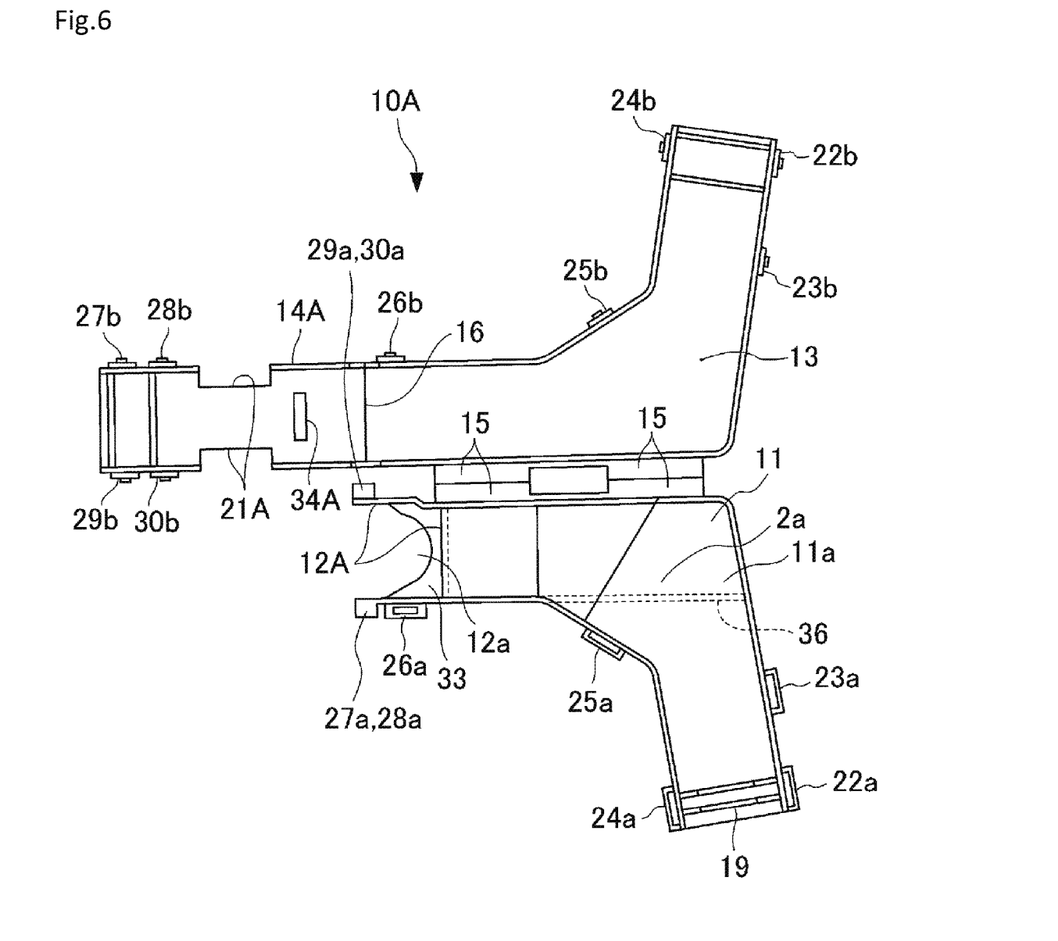
FIG. 6 is a plan view of a protector according to a wire harness according to a second embodiment.

FIG. 6 is a plan view of a protector 10A according to a wire harness according to a second embodiment.

As shown in FIG. 6, the protector 10A has configurations substantially identical to the configurations of the protector 10 according to the first embodiment, described above with reference to FIGS. 1 through 4. Accordingly, configurations that are identical to the configurations of the protector 10 according to the first embodiment are assigned identical reference numerals and descriptions thereof are omitted; only configurations specific to the present embodiment are described.

In the protector 10A according to the present embodiment, a second locking part 21A provided to a second cover part 14A differs from the second locking part 21 of the protector 10 according to the first embodiment.

The second locking part 21A is provided to the second cover part 14A as a tape winding locking part configured by a notch. The second cover part 14A is provided with a checking window 34A at a location slightly closer to the first cover part 13 than the second locking part 21A, for the purpose of checking the end portion of the second corrugated tube 4.

In order to manufacture a wire harness equipped with the protector 10A on the drawing board, the protector 10A is placed in a prescribed position on the drawing board and the wire group is routed in a manner similar to that of the first embodiment; by closing the first cover part 13, the first bent portion of the wire group is protected by the first bent portion protecting part 11 and the first cover part 13 of the protector 10A.

Next, the second corrugated tube is applied to the undersurface of the second cover part 14, the second cover part 14A projecting horizontally due to being inverted by the closing of the first cover part 13 (see FIG. 4), and the tape winding locking part is formed by winding a tape in a state where the second corrugated tube is coupled with the second locking part 21A. As a result, displacement of the second corrugated tube in the axial direction is disabled, thereby allowing for positioning of the wire group on a horizontal-side end portion of the protector 10A. Next, as in the first embodiment, the second cover part 14A is bent downward and closed together with the second bent portion protecting part 12 and locked (see FIG. 5).

Third Embodiment

Figure 7:
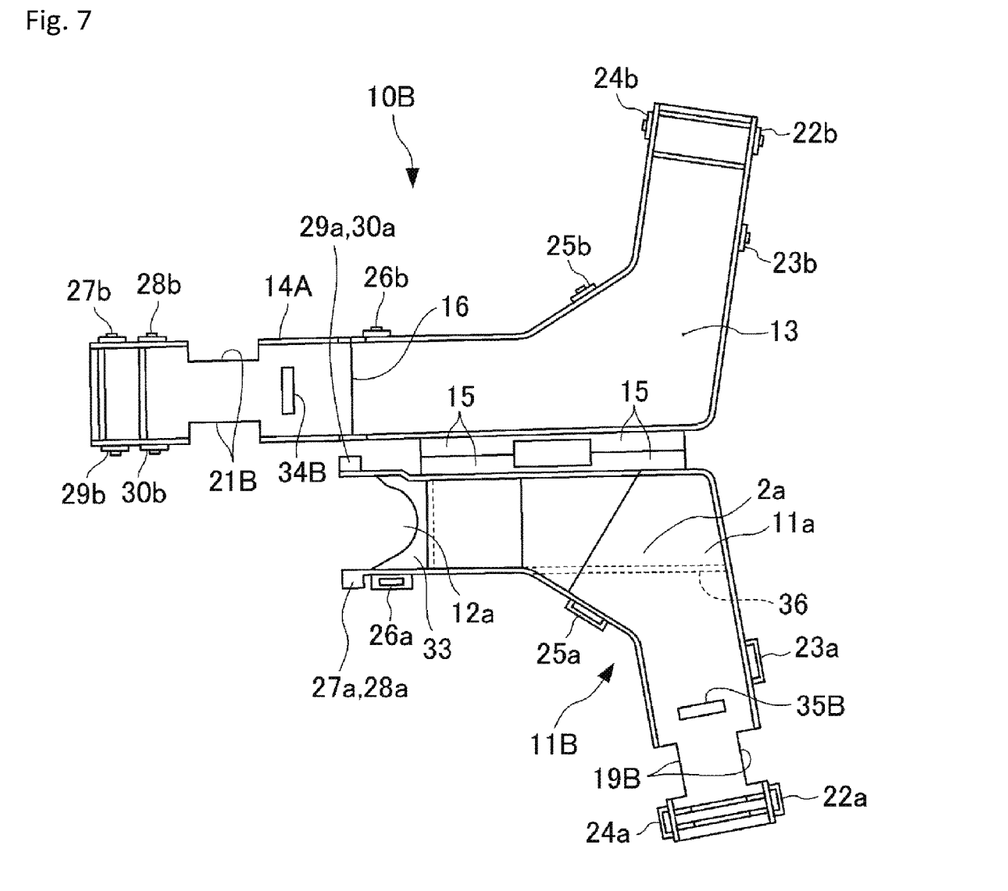
FIG. 7 is a plan view of a protector according to a wire harness according to a third embodiment.

FIG. 7 is a plan view of a protector 10B according to a wire harness according to a third embodiment.

As shown in FIG. 7, the protector 10B has configurations substantially identical to the configurations of the protector 10 according to the first embodiment. Accordingly, configurations that are identical to the configurations of the protector 10 according to the first embodiment are assigned identical reference numerals and descriptions thereof are omitted; only configurations specific to the present embodiment are described.

In the protector 10B, a first locking part 19B and a checking window 35B are provided to a first bent portion protecting part 11B, and a second locking part 21B and a checking window 34B are provided to a second cover part 14B. As with the second locking part 21A according to the second embodiment, the first locking part 19B and the second locking part 21B are provided as tape winding locking parts which lock the wire group by winding a tape therearound.

According to the wire harness equipped with the protector 10B, while the wire group is housed in the first bent portion protecting part 11B, displacement of the wire group 2 in the axial direction is disabled at the first locking part 19B by winding a tape around the wire group. The first cover part 13 is closed and locked, and the second corrugated tube is applied to an undersurface of the second cover part 14B, the second cover part 14B projecting horizontally due to being inverted (see FIG. 4), and the tape winding locking part is formed by winding a tape in a state where the second corrugated tube is coupled with the second locking part 21B. As a result, displacement of the second corrugated tube in the axial direction is disabled, thereby allowing for positioning of the wire group on a horizontal-side end portion of the protector 10B. Next, as in the first embodiment, the second cover part 14B is bent downward and closed together with the second bent portion protecting part 12 and locked (see FIG. 5).

Other Embodiments

The present invention is not limited to the embodiments described above, and the technical scope of the present invention as set forth in the claims include various embodiments of modified design within the scope of the gist of the invention.

In the first through third embodiments described above, the example shown is one in which the wire group is not split at the portion in need of protection by the protector; however, the wire group may be split at the portion in need of protection by the protector. In such a case, the first bent portion protecting part is formed into a shape corresponding to a branch shape of the wire group, and the first cover part is also formed into a corresponding shape so as to close the opening of the first bent portion protecting part.

In the first through third embodiments described above, the wire group is covered by the first and second corrugated tubes and each end portion of the first and second corrugated tubes is locked by first and second locking parts; however, the present invention includes a wire harness having a configuration in which the wire group is locked by winding a tape, using the protector of the third embodiment.

According to the present invention, with respect to protection of the three-dimensionally routed bent portion of the wire group, it is possible to, following protection of the planarly-bent portion, position the downwardly-bent portion in the planarly developed state without bending it downward and then protecting the same by bending it downward thereafter; whereby the present invention has an effect of allowing repositioning of the wire group on the drawing board to be omitted. Thus, the present invention is useful for protectors and wire harnesses in general.

DESCRIPTION OF REFERENCE NUMERALS 1 wire harness
3 first corrugated tube
4 second corrugated tube
10A, 10B, 10C protector
11, 11B first bending portion protecting part
12 second bending portion protecting part
13 first cover part
14, 14A, 14B second cover part
15 hinge part
19, 19B first locking part
20 U-band part
21, 21A, 21B second locking part
22a-26a, 22b-26b first cover-closing means
27a-30a. 27b-30b second cover-closing means

The invention claimed is:

1. A protector configured to protect a bent portion of a wire group, the bent portion being routed to bend in a planar direction and then bend further in a downward direction, the protector comprising:
a first bent portion protecting part having a recessed groove-shaped cross section defined by three intersecting surfaces of the first bent portion protecting part and housing a horizontally-bent first bent portion of the wire group;
a second bent portion protecting part extending integrally downward from one end of the first bent portion protecting part, having a recessed groove-shaped cross-section defined by three intersecting surfaces of the second bent portion protecting part and housing a downwardly-bent second bent portion of the wire group;
a first cover part closing an open surface of the first bent portion protecting part;
a second cover part closing an open surface of the second bent portion protecting part; and
a first locking part positioning one end portion of a first corrugated tube or the wire group, the first corrugated tube protecting the wire group and being provided to another end portion of the first bent portion protecting part,
wherein the first cover part is integrally linked to a side surface upper edge portion of the first bent portion protecting part via a hinge part provided on a side surface of an outer circumference side of the first bent portion of the wire group, the side surface being adjacent to the second bent portion protecting part and, upon closing, is locked by a first cover closure provided between the first bent portion protecting part and the first cover part;
wherein the second cover part is integrally formed with the first cover part at a flexible joint, the second cover part being configured to extend in the same plane as the first cover part and configured to rotate in a downward direction about the flexible joint so as to be in a closed state with respect to the second bent portion protecting part and locked by a second cover closure provided between the second bent portion protecting part and the second cover part after the first cover part is closed; and
wherein an end portion of the second cover part, the end portion being on an opposite side from a side connected to the first cover part, is provided with one end portion of a second corrugated tube or a second locking part, the second corrugated tube protecting the wire group housed in the first bent portion protecting part and the second locking part positioning the wire group.

2. The protector according to claim 1, wherein the first locking part is configured to enter into a valley portion of the first corrugated tube housed in the first bent portion protecting part and lock the first corrugated tube.

3. The protector according to claim 1, wherein the first locking part is a tape winding locking part which locks the first corrugated tube housed in the first bent portion protecting part or the wire group by winding a tape therearound.

4. The protector according to claim 1, wherein the second locking part is provided to a U-band part provided to the second cover part, the second cover part being in an open state and on a same plane as the first cover part, and wherein the second locking part is configured to enter into a valley portion of the second corrugated tube supported by the U-band part and lock the second corrugated tube.

5. The protector according to claim 1, wherein the second locking part is provided as a tape winding locking part which locks the second corrugated tube abutting on an inner surface side of the second cover part or the wire group by winding a tape therearound, the second cover part being in the open state and on the same plane as the first cover part.

6. A wire harness, comprising:
the protector according to claim 1;
a wire group housed in the protector so as to be three-dimensionally bent;
the first corrugated tube covering a portion of the wire group extending outwardly in a horizontal direction from inside one end of the protector, wherein an end toward the protector-side is positioned by being locked or wound by a tape at the first locking part of the protector; and
the second corrugated tube covering a portion of the wire group extending outwardly in a downward direction from inside another end of the protector, wherein an end toward the protector-side is positioned by being locked or wound by a tape at the second locking part of the protector.

7. A wire harness, comprising:
the protector according to claim 1; and
a wire group housed in the protector to be three-dimensionally bent, wherein the wire group is positioned by being wound by a tape at the first locking part and the second locking part provided to both end portions of the protector.

* * * * *